Aug. 17, 1965    J. P. LANIGAN ETAL    3,200,919
REVERSIBLE DOUBLE-DRIVE CLUTCH
Filed Sept. 25, 1964    2 Sheets-Sheet 1

INVENTORS
JAMES P. LANIGAN
EUGENE F. WALLACE
HAROLD L. SALAUN, JR.
JAMES I. KOTTER

BY
R. Hoffman
ATTORNEY

Aug. 17, 1965  J. P. LANIGAN ETAL  3,200,919
REVERSIBLE DOUBLE-DRIVE CLUTCH
Filed Sept. 25, 1964  2 Sheets-Sheet 2

INVENTORS
JAMES P. LANIGAN
EUGENE F. WALLACE
HAROLD L. SALAUN, JR.
JAMES I. KOTTER

BY R. Hoffman
ATTORNEY

United States Patent Office 3,200,919
Patented Aug. 17, 1965

3,200,919
REVERSIBLE DOUBLE-DRIVE CLUTCH
James P. Lanigan, Metairie, Eugene F. Wallace, Chalmette, and James I. Kotter and Harold L. Salaun, Jr., Metairie, La., assignors to the United States of America as represented by the Secretary of Agriculture
Filed Sept. 25, 1964, Ser. No. 399,421
1 Claim. (Cl. 192—48)
(Granted under Title 35, U.S. Code (1952), sec. 266)

A non-exclusive, irrevocable royalty-free license in the invention herein described, for all governmental purposes, throughout the world, with the power to grant sublicenses for such purposes, is hereby granted to the Government of the United States of America.

This invention provides a mechanical apparatus whereby a single driving source can be caused to shift its driving torque from a first driven system (component) to a second driven system by changing the direction of rotation of the driving source and is a continuation-in-part of Serial No. 241,080 filed November 29, 1962, now Patent No. 3,158,244.

With the great expansion of machinery development and the continued increase of industrial automation, the need for a reversible double-drive clutch as described herein will be apparent to those skilled in the art of machinery design.

Conventional methods for operating two sequential low speed drive systems generally required either two separate driving sources, two separate clutches or some type of tarnsmission.

The apparatus of this invention permits one reversible source of driving torque to drive in sequence two indepent systems. Reversing the source of driving torque, immediately disengages one system completely and allows same to free wheel as the other system becomes engaged and driven positively.

It is an object of this invention to provide a means for driving alternately two sequential systems.

Another object of this invention is to reduce the number of components necessary to accomplish two sequential drive operations.

Still another object of this invention is to provide a reversible double-drive clutch one embodiment of which includes clutch elements equipped with positive, non-slip, jaw-type teeth capable of transmitting high torque from the driving source to the driven systems at low speeds and with no loss in mechanical efficiency.

More particularly, this invention relates to a reversible, double-drive clutch in which the tendency of the clutch to "lock-up" (i.e., disengage sluggishly and with difficulty) when subjected to high torque, slow speed transmission is eliminated. "Lock-up" is brought about, not by reluctance of the clutch elements themselves to disengage, but by tightening of the screw thread of the traveler on the corresponding thread of the driven shaft after the fashion of a nut tightening on its bolt counterpart.

It will be obvious to those skilled in the art that the transmission of torque between the several clutch members of this apparatus can be accomplished with means other than the toothed elements of the embodiment disclosed.

Friction type clutch facings, for example, can be employed to transmit relatively low torque.

The reversible double-drive clutch, according to the invention, is described in detail below reference being made to the accompanying drawings in which.

Figure 2:
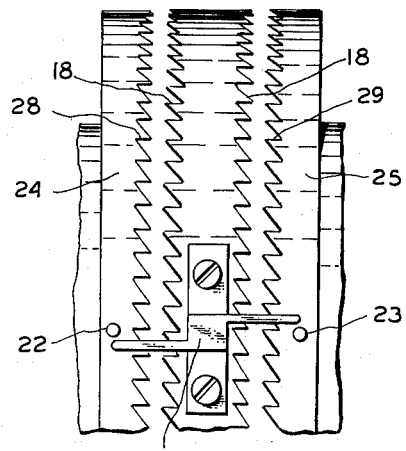
FIGURE 2 represents a partial plan view of the clutch assembly showing the indexing bar and pins.

Referring to the drawings, the reversible double-drive clutch assembly is installed on drive shaft 12 which is connected to or is part of a reversible driving means such as an electrical motor (not shown). Screw threads 13 are constructed onto sleeve 14 which is securely fastened to shaft 12 by means of key 15 and set screw 16.

Toothed traveler 17, having teeth 18 constructed on the radial extremities of each of its faces 19 and 20, has internal threads 37 which match screw threads 13 of threaded sleeve 14. Directional movement of toothed traveler 17 is governed by directional rotation of sleeve 14 fastened to drive shaft 12. Indexing bar 21, made of slightly flexible material, is fastened to periphery of toothed traveler 17 and bears on either indexing pin 22 or indexing pin 23, depending on rotation of drive shaft 12.

Indexing pins 22 and 23 are fastened to and extend from periphery of toothed drive sprockets 24 and 25, respectively.

Toothed drive sprockets 24 and 25 are fitted with bushings 26 and 27, respectively, and are free to rotate on sleeve 14. Toothed drive sprockets 24 and 25 have teeth 28 and 29 located on the radial extremities of their inner faces 30 and 31, respectively.

Keeper nuts 32 and 33 are threaded to match threads 34 of sleeve 14 and are locked to sleeve 14 by set screws 35 and 36. The clutch is held in assembly by keeper nuts 32 and 33.

If toothed traveler 17 is in neutral position as shown, and drive shaft 12 starts to rotate in direction A, then toothed traveler 17 moves to position A' where its teeth 18 on its face 20 engage with teeth 29 of toothed drive sprocket 25. Toothed traveler 17 is guided into aligned engagement with toothed drive sprocket 25 by means of its indexing bar 21 bearing on indexing pin 23. Torque is transmitted from shaft 12 through traveler 17 to toothed drive sprocket 25 which drives a system X. As this occurs, indexing bar 21 flexes slightly allowing the load to shift from pin 23 to teeth 29 of sprocket 25.

When drive shaft 12 reverses, thereby rotating in direction B, toothed traveler 17 disengages toothed drive sprocket 25 and moves to location B' where it engages with toothed drive sprocket 24. Aligned engagement is accomplished by its indexing bar 21 bearing on indexing pin 22 of toothed drive sprocket 24. Upon disengagement, drive sprocket 25 is completely released, thereby allowing system X to move freely. Torque is transmitted from shaft 12 through traveler 17 to toothed drive sprocket 24 which drives system Y.

Where high rotational speed and/or relatively lower torque transmission is required, the reversible double-drive clutch may be equipped with friction disks in place of teeth 18, 28, and 29. The friction disks are thus located on faces 19 and 20 of traveler 17, and inner faces 30 and 31 of drive sprockets 24 and 25, respectively. With the use of friction disks the indexing guide 21 and the indexing pins 22 and 23 may be eliminated.

Where high torque transmission and/or ease of response is essential to a particular operation, the reversible double-drive clutch may incorporate a conventional ball screw in place of the corresponding standard screw threads 13 on sleeve 14 and toothed traveler 17. Use of the ball screw, in most instances, will afford instant release of the engaged traveler 17, especially where high load transmission is encountered. Whenever extremely high torque is being transmitted at low speeds the traveler screw thread may tighten on the matching shaft thread and impede disengagement despite the use of a ball screw. The drive pins 50 and 51 which are the particular feature of this invention will prevent the traveler 17 of a so equipped clutch from tightening regardless of the torque applied.

Figure 3:
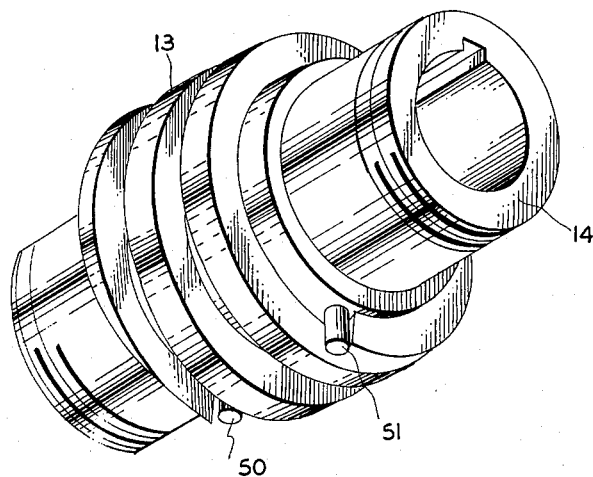
FIGURE 3 is an isometric view of the threaded sleeve which sleeve is keyed to the main shaft of the clutch.
Figure 4:
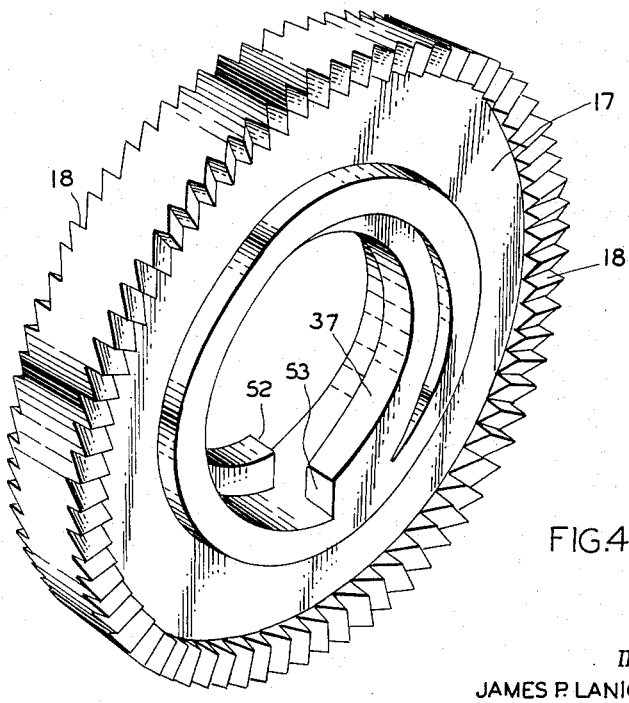
FIGURE 4 is an isometric view of the traveler, the internal thread of whose central bore matches and moves upon the external central thread of the sleeve of FIGURE 3.

Referring to FIGURES 3 and 4, pins 50 and 51 are permanently fixed to threaded sleeve 14 in the space between and at each end of threads 13. Toothed traveler 17 has internal threads 37 which match screw threads 13 of threaded sleeve 14. Threads 37 are constructed as shown to form thread end-surfaces 52 and 53, which when assembled bear upon pins 50 and 51 respectively, depending on directional rotation of sleeve 14 fastened to shaft 12 (FIGURE 1).

Figure 1:
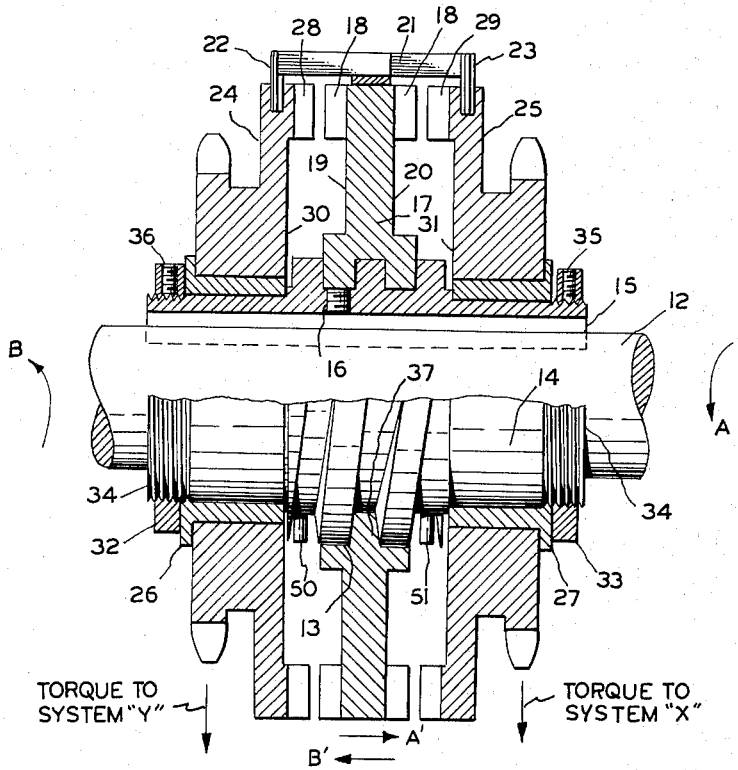
FIGURE 1 represents a partial cross-sectional view of the clutch assembly with the sleeve screw shown partially in full view and partially in cross-section.

Directional movement of toothed traveler 17 is governed by the direction of rotation of the driving source which is transmitted through shaft 12 (FIGURE 1).

Referring to FIGURES 1 and 2, for toothed traveler 17 to move from position A' to position B', the driving source must be reversed, thereby rotating in direction B and the indexing bar 21 must contact indexing pin 22. When the driving source is reversed, the meshing of the teeth 18 and 29 prevents traveler 17 from rotating relative to the drive sprockets. Thus as the threaded sleeve 14 rotates, the toothed traveler 17 moves axially toward position B' sufficiently far enough from toothed drive sprocket 25 for indexing bar 21 to contact indexing pin 22. The slight restriction necessary to prevent traveler 17 from rotating relative to the drive sprockets is transferred from meshing teeth 18 and 29 to indexing pin 22, as indexing bar 21 contacts and bears upon indexing pin 22.

As a result of this action, traveler 17 is guided into aligned engagement with toothed drive sprocket 24. Before end thrust is developed between toothed traveler 17 and drive sprocket 24, thread end-surface 52 contacts pin 50, stopping transverse movement. When this occurs, toothed traveler 17 immediately begins rotating at the speed of shaft 12 and torque is transmitted from shaft 12 through traveler 17 to toothed drive sprocket 24 which drives system Y. Concurrently, indexing bar 21 flexes slightly allowing the load to shift from indexing pin 22 to teeth 28 of sprocket 24.

Upon disengagement, drive sprocket 25 is completely released, thereby allowing system X to move freely.

Although the apparatus is described using sprockets as a means for transmitting motion to each of the systems, the successful performance of the invention is not so limited. Other means such as gears, timing belt pulleys, pulleys, et cetera, or any combination thereof may be incorporated.

We claim:

A reversible double-drive clutch comprising in combination:

(a) a driven shaft carrying a uniform external screw thread integral with the central portion of said shaft, said thread originating and terminating on said central portion,
  (1) a first radially disposed stop pin located radially adjacent the origin of said external screw thread and
  (2) a second radially disposed stop pin located radially adjacent the terminus of said external screw thread, said first and said second stop pins extending radially relative the screw thread and adapted to act as stops at the origin and terminus of said external screw thread;
(b) a first generally disc-shaped end clutch member rotatably mounted on said driven shaft and located in an axially fixed position adjacent the origin of said external screw thread and associated stop pin, said first clutch member being provided with clutch elements on the face directed toward the central portion of the driven shaft and provided with torque transfer elements on the face directed away from the central portion of the driven shaft;
(c) a second generally disc-shaped end clutch member rotatably mounted on said driven shaft and located in an axially fixed position adjacent the terminus of said external screw thread and associated stop pin, said second clutch member being provided with clutch elements on the face directed toward the central portion of the driven shaft and provided with torque transfer elements on the face directed away from the central portion of the driven shaft; and
(d) a third generally disc-shaped clutch member provided with clutch elements on each face, said third clutch member incorporating a central bore carrying a uniform internal thread adapted to match and to move upon the external thread of said driven shaft, said third clutch member mounted upon said driven shaft intermediate said first and said second end clutch members and axially movable on said driven shaft via the internal screw thread of the central bore of said third clutch member and the matching external screw thread of the driven shaft, said internal thread terminating at each end with a flat radially and axially disposed transverse porition adapted to contact the stop pins at the ends of said driven shaft screw thread thereby limiting the axial travel of said third clutch member, whereby rotation of the driven shaft in one direction urges the third clutch member and accompanying clutch elements against the clutch elements of the first of the end clutch members to establish a drive path from said driven shaft through the respective clutch elements of said first end clutch member and third clutch member to the torque transfer means of said first end clutch member, and whereby reversing the rotation of the said driven shaft disengages the engaged clutch elements of the first end and third clutch members, moves the third clutch member across the intervening space between the two end clutch members and urges the clutch elements of the third clutch member against the clutch elements of the second end clutch member to establish a drive path from said driven shaft through the clutch elements of the third clutch member and said second end clutch member to the torque transfer means of said second end clutch member.

References Cited by the Examiner

UNITED STATES PATENTS

| | | | |
|---|---|---|---|
| 1,254,180 | 1/18 | Ward | 192—43 |
| 1,991,756 | 2/35 | Lazich | 192—51 X |
| 2,371,564 | 3/45 | Wemp | 192—54 X |
| 2,845,807 | 8/58 | Harless | 192—51 X |

DON A. WAITE, *Primary Examiner.*

DAVID J. WILLIAMOWSKY, *Examiner.*